Dec. 8, 1959  E. O. SCHONSTEDT  2,916,696
SATURABLE MEASURING DEVICE AND MAGNETIC CORE THEREFOR
Filed Dec. 5, 1955  3 Sheets-Sheet 1
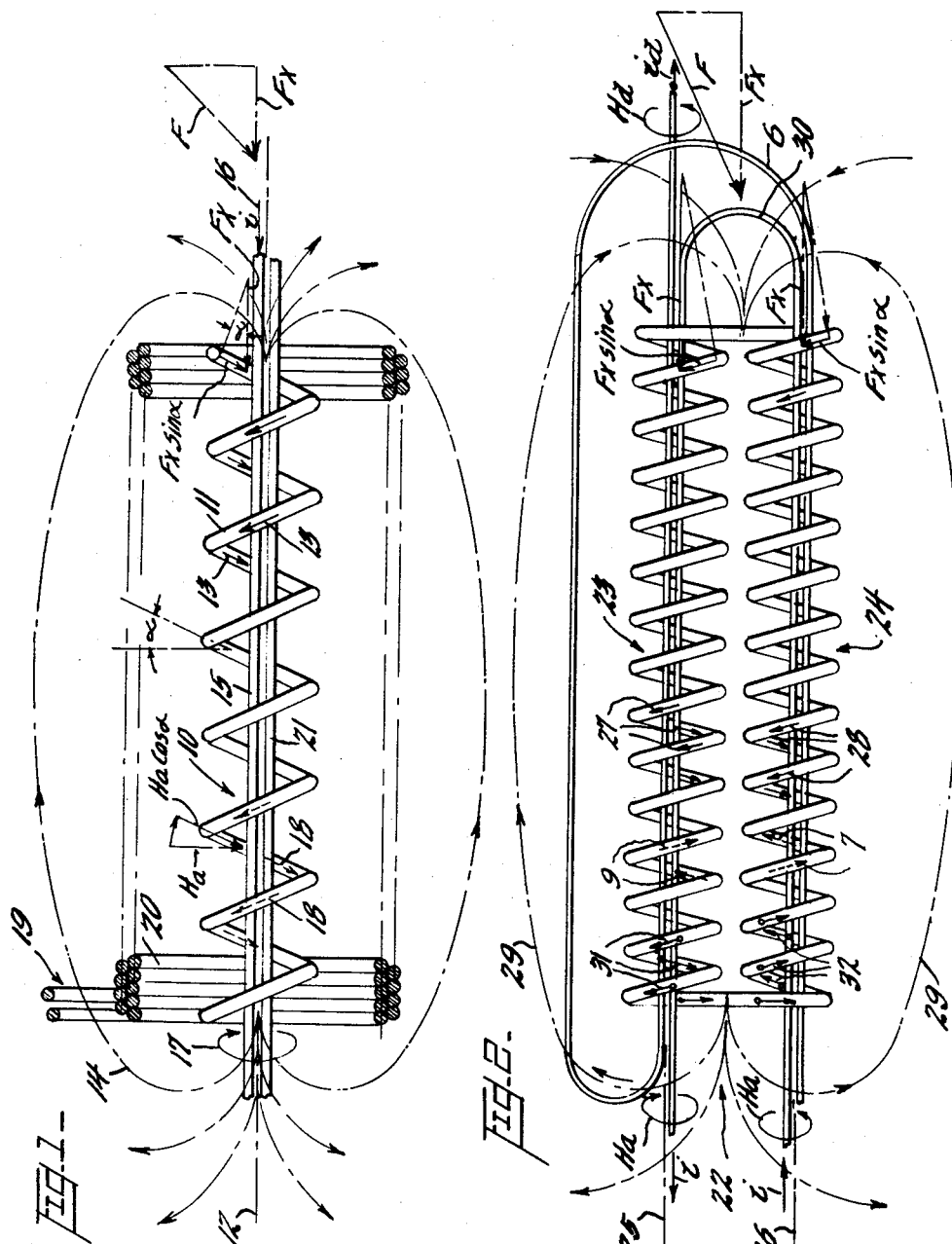
INVENTOR
ERICK O. SCHONSTEDT
BY
ATTORNEY

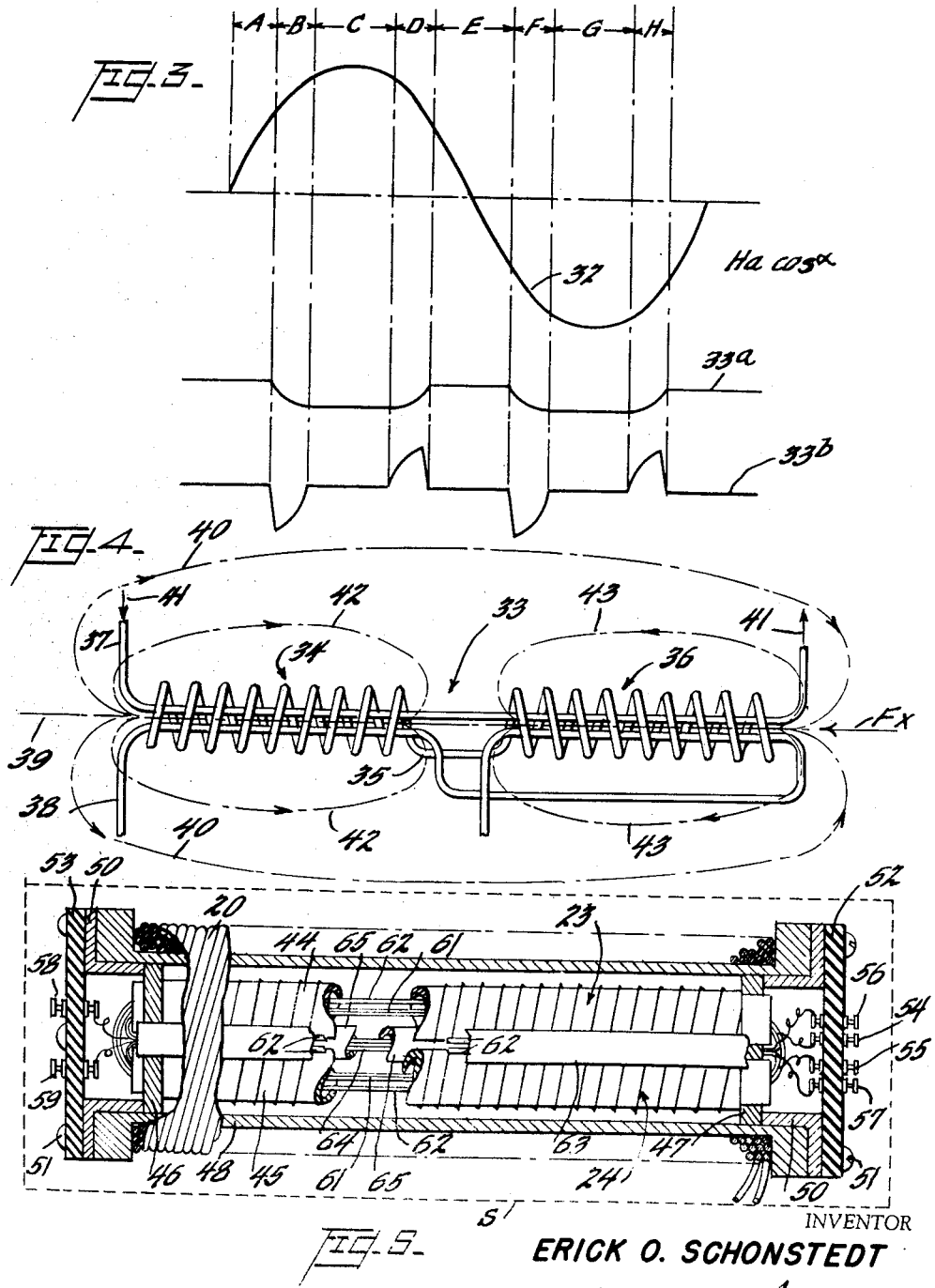

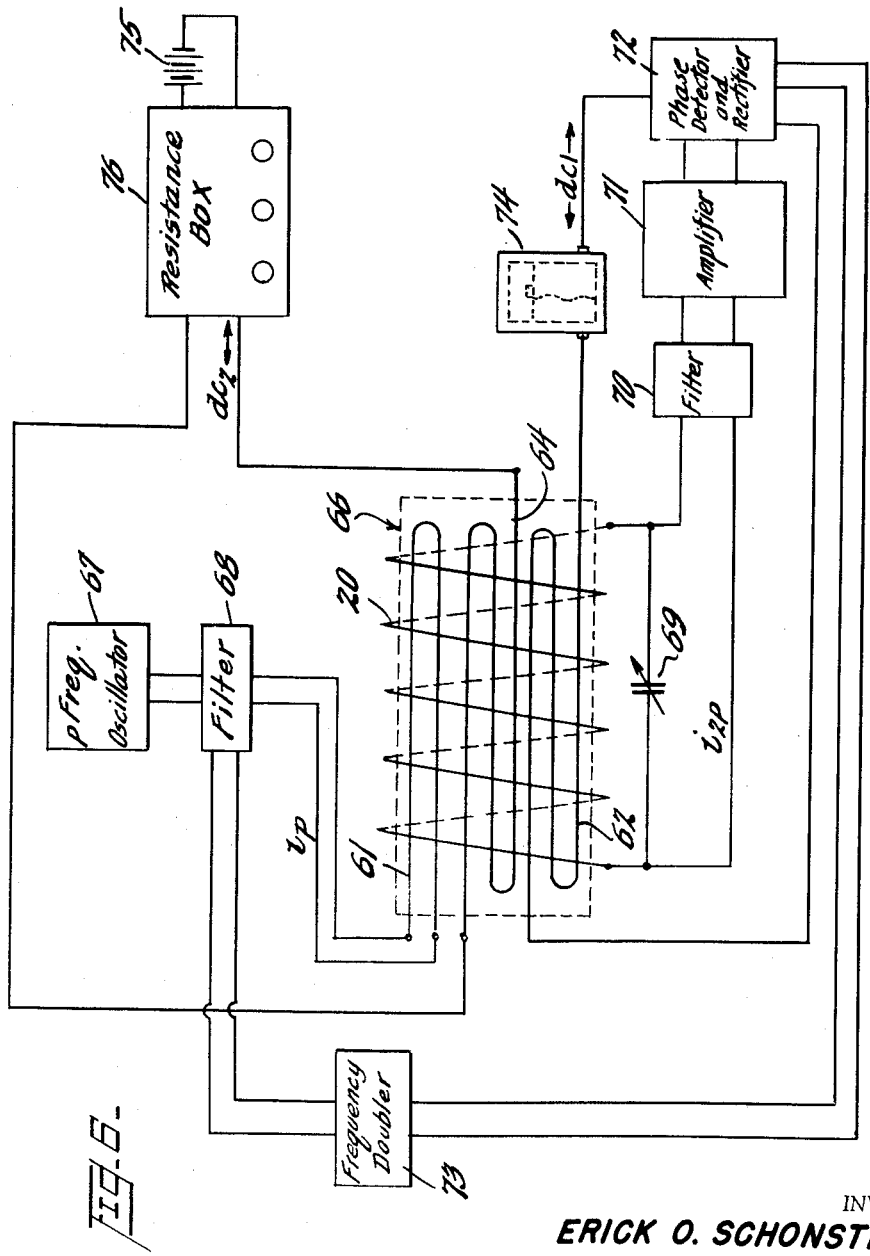

2,916,696

SATURABLE MEASURING DEVICE AND MAGNETIC CORE THEREFOR

Erick O. Schonstedt, Silver Spring, Md.

Application December 5, 1955, Serial No. 551,027

13 Claims. (Cl. 324—43)

The present invention relates to magnetic saturable measuring devices and to magnetic cores which may be used in such devices. More particularly the invention has application to the field of magnetometers and flux responsive measuring devices.

Magnetometers of the prior art that have essentially zero direct coupling between their excitation and signal pickup windings and/or employ endless magnetic paths have been constructed by placing a pickup coil coaxially about a "Permalloy" wire through which an alternating current is passed, the current being of sufficient amplitude that its associated magnetic field saturates the wire so as to form an annular flux about the center of the wire. An externally-applied static field, as for example, the earth's field or a field produced by a direct current which it is desired to measure, magnetizes such a wire along its length. Second-harmonic pulses occur in the pickup coil due to the fact that the cyclical annular saturation of the magnetic material of the "Permalloy" wire varies the magnitude of the magnetic flux existing parallel to the axis of the wire so as to create an asymmetrical cyclical pulsation of the external flux which cuts the surrounding pickup coil. Magnetometers of this type have a disadvantage in that the excitation field does not saturate the wire in directions along the length of the wire and hence does not completely shake out any tendency for the applied static field to produce a significant amount of permanent magnetization in the wire along its length. The same situation is true for similar magnetometers in which the magnetic core is comprised of a "Permalloy" tube through which a copper wire has been threaded to carry the excitation current. In the present invention, the direction of the flux in a core subjected to an applied static field is completely reversed by an excitation field, thereby making the core much less subject to being permanently magnetized by the applied static field.

Accordingly, it is an object of the invention to provide an improved means for measuring the intensity of weak magnetic fields, such as that of the earth.

Another object of the invention is to provide a magnetic core having a magnetic axis of sensitivity and which core can be magnetized in a direction parallel to said axis by means of a magnetic field directed parallel to said axis and by means of a magnetic field annularly directed about said axis.

A further object of the invention is to provide a magnetic field sensing device having a magnetic core, said core possessing an axis of sensitivity, in which the magnetization of the core can be achieved by an externally applied magnetic field directed parallel to said axis, and the effect of said externally applied field can be neutralized by means of a static annularly directed field generally centered about said axis.

An additional object of the invention is to provide a magnetic-field sensing element having an excitation winding and a signal pickoff winding with said windings arranged so as to have essentially zero coupling with one another.

Still another object of the invention is to provide a magnetic field sensing device having a magnetic core which can be cyclically driven into saturation by means of an annularly directed magnetic field and which core is resistant to becoming permanently magnetized.

A further object of the invention is to provide a magnetic field sensing element having an excitation winding and at least one neutralization winding with said neutralization winding having no mechanical or substantially no net electrical coupling to the excitation winding.

Another object of the invention is to provide an improved magnetic field sensing element having a magnetic core that can be magnetized by an annular magnetic field that encounters an endless magnetic path.

A further object of the invention is to provide a magnetic core having helical-coil sections, the performance of said core being governed by the pitch and polarity of the helix angles.

Yet another object of the invention is to provide a magnetizable magnetic core having at least one helical section, each of said sections possessing an axis of easy magnetization and each of said sections being magnetizable by an annular magnetic field such that the net direction of the flux produced in said sections is substantially parallel with said axis of easy magnetization.

An additional object of the invention is to provide an improved magnetic means for converting a direct current signal into an alternating current signal.

A still further object of the invention is to provide an improved means with which an alternating current signal may be used to cyclically magnetize a core of said means so as to produce double-frequency alternating current signals proportional in magnitude to the intensity of a direct current flowing through a winding of said means.

Yet another object of the invention is to provide a sensitive magnetic field sensing element which enables a magnetometer to be constructed which has a simplified electrical circuit and which is low in weight.

An additional object of the invention is to provide an improved means for magnetizing a magnetic core.

Still another object of the invention is to provide unique sectional magnetic cores.

A further object of the invention is to provide a magnetometer with unique multi-section magnetic cores.

These and other objects of the invention will become more apparent in the following detailed description taken in conjunction with the accompanying drawings wherein:

Fig. 1 is a diagrammatic view of a simple form of the invention with explanatory vector illustrations;

Fig. 2 is a view of a modification of the invention in which a double core having side-by-side sections is employed;

Fig. 3 is a graphical presentation illustrating the operation of the device of Fig. 2;

Fig. 4 is a view of a modification of the invention in which a core having axially spaced core sections is employed;

Fig. 5 is a longitudinal sectional view of a preferred physical embodiment of the invention constructed in accordance with the principles illustrated in Fig. 2; and Fig. 6 is a block, partly schematic, diagram of a preferred system utilizing the teachings of the invention.

Briefly, the present invention contemplates a permeable helical core which may be magnetized by an excitation field and by a field the intensity of which is to be measured or which is proportional to a phenomenon to be measured. The core may assume different forms and may be associated with an excitation winding, a pickup winding, a neutralization winding, and in some cases a signal winding. The term "winding" as used herein is intended to include coils which may have multiple turns or single turns, and also elongated wires through which a current may be passed. In a preferred form, the excitation winding may carry an alternating current for producing a flux which saturates the core. Certain of the windings may be arranged for essentially zero coupling with each other.

An elementary form of the invention is illustrated by Figure 1. In this figure a magnetic core 10 is shown which is comprised of a wire 11 made of highly permeable magnetic material such as "Permalloy" that has been shaped into a helical form resembling a coil spring. Core 10 has a helix axis 12 and a helix angle $\alpha$. Core 10 is illustrated as lying in a magnetic field the direction and intensity of which is represented by the vector labeled F. This magnetic field may be a weak field, such as that of the earth. Parallel with helix axis 12 of core 10 is a component $F_x$ of field F. Component $F_x$ is the field intensity to be measured by the magnetometer of the invention. Component $F_x$ has a subcomponent $F_x \sin \alpha$, this subcomponent being instrumental in the generation of magnetic flux within the core. The direction of the flux induced in the core by $F_x \sin \alpha$ is generally indicated by arrows 13. Although $F_x \sin \alpha$ may be small relative to $F_x$, $F_x \sin \alpha$ will induce a considerable amount of flux in the core because of the long, stretched-out length of wire 11 comprising the core. The external magnetic flux produced by the magnetization of the core is represented by lines 14.

To core 10 may be added an electrically conductive wire 15, such as a copper wire, which threads said core in a direction substantially parallel with helix axis 12. An electrical current of intensity $i$ and having a direction represented by arrow 16 is indicated to be flowing through wire 15. Current $i$ has associated with it an annular magnetic field that has an intensity $H_a$ at the material of the material of the core, and which acts in the direction generally represented by the curved arrow 17. The relationship between current $i$ and annular field $H_a$ is in accordance with the well-known right-hand rule. Field $H_a$ has a component $H_a \cos \alpha$ that is directed parallel to the centerline of wire 11 comprising core 10. This component magnetizes the core so as to produce a magnetic flux within the core that has a direction generally represented by the dashed arrows 18.

The annular field component $H_a \cos \alpha$, in the example illustrated, magnetizes the core in the same directions as the component $F_x \sin \alpha$. It may be assumed that $F_x \sin \alpha$ is of insufficient intensity to magnetically saturate the core. By making $H_a \cos \alpha$ of sufficient magnitude, the core can be brought into a state of magnetic saturation, and the external flux represented by lines 14 will be at its maximum intensity. For the direction of current $i$ illustrated in Fig. 1, $F_x \sin \alpha$ will aid in bringing about saturation. Any increase in intensity of $H_a \cos \alpha$ above that level required to achieve saturation will not result in an increase in external flux.

As current $i$ decreases in intensity from its maximum, the external flux will remain at a constant magnitude until the point is reached at which the combined effects of $F_x \sin \alpha$ and $H_a \cos \alpha$ are just sufficient to saturate the core magnetically. As excitation current $i$ is further decreased the external flux will decrease. When current $i$ is equal to zero, the external flux existing will be due only to that produced by component $F_x \sin \alpha$. If the direction of the current is reversed and $F_x \sin \alpha$ and $H_a \cos \alpha$ are equal in intensity but oppositely directed, the external flux will drop to zero. By increasing the intensity of current $i$ flowing in the reverse direction, $H_a \cos \alpha$ may be made sufficiently strong to saturate the core in the reverse direction, in which case the external flux will be directed opposite to that illustrated in Fig. 1. The external flux will remain constant as long as the net field presented by $H_a \cos \alpha$ minus $F_x \sin \alpha$ is above the level required for saturation.

By making current $i$ an alternating current of sufficient amplitude the core can be driven into saturation during the positive and the negative extremes of the current cycle. However, because component $F_x \sin \alpha$ aids the annular field in saturating the core on one phase of the current cycle and opposes it on the other, the core will remain in saturation longer during one phase than it does on the reverse phase. The pulsation of the external flux will thus not be the same for the two halves of the current cycle.

Core 10 may be surrounded by a pickup coil 19 which may comprise numerous turns 20 of copper wire which may be would about the length of the core. The pulsating flux emanating from the magnetically excited core induces electrical voltages across the windings of said pickup coil. These voltages are proportional to the rate at which the external flux cuts the windings of the coil. When $F_x$ is zero, the voltages so induced will be comprised of components having the same frequency as the excitation current and components of frequencies which are odd-numbered multiples thereof. With $F_x$ equal to zero, theoretically there will be no voltage components of frequencies that are even-numbered multiples of the excitation frequency. In practice even-numbered multiples of negligible amplitude may appear.

As mentioned previously, the existence of some component $F_x$ acting along the axis of the core causes the pulsation of the external flux to be dissimilar on the two havles of the excitation current cycle. Because of this dissimilarity, the voltages induced in the pickup coil will have an unsymmetrical wave form and thus contain significant even-order harmonics in addition to the previously-mentioned odd-order harmonics. For weak magnetic fields, such as that of the earth, the intensity of the even-order harmonics has been found to be proportional to the strength of the externally applied static field $F_x$. Any one of such even-order harmonics can be separated by means of a band-pass filter and employed to measure the applied static magnetic field intensity, as for example, in the manner described in Patent No. 2,427,666 issued to E. P. Felch, Jr., et al.

In magnetometers of the saturable-inductor type it is frequently desirable to oppose the magnetization of the magnetic core by means of an adjustable-intensity magnetic field. In prior art magnetometers, this has been done by passing a properly polarized direct current through a solenoid, such as that illustrated by pickup coil 19 of Fig. 1. The field produced by this direct current acts on the core in a direction opposite to that of the externally applied magnetic field. This method can be used in the present invention by passing a direct current through the windings of solenoid 19. However, this invention makes it possible to achieve neutralization by passing a direct current through wire 15 which carries the excitation current. Furthermore, an additional wire 21 can be added to carry the direct current, thereby separating the neutralization circuit from the excitation circuit. Additional wires of the type illustrated by wire 21 can be added to provide as many isolated neutralization paths as desired. The use of a neutralization path of the type illustrated by wire 21 has the advantage of making possible neutralization circuits which have no physical connection to and very little electrical coupling with the other circuits of the magnetometer, thereby making possible a simpler electrical circuit than has been previously possible.

In a more preferred form of the invention, illustrated in Fig. 2, a magnetic core 22 is comprised of two helically-shaped sections 23 and 24 which are aranged side-by-side and which may be joined together at their ends so as to form an endless path of magnetic material. Section 23 and 24 may be wound in the same direction. The existence of a component of a weak static field $F_x$ parallel with axes 25 and 26 of sections 23 and 24, respectively, results in the induction of internal fluxes in core 22 which are generally represented by arrows 27 and 28. The resulting flux external to said core is represented by lines 29.

Core 22 may be threaded by a wire 30 passing through sections 23 and 24 in opposite directions. A current $i$ that flows in wire 30 will have associated with it an annular magnetic field $H_a$ which magnetizes section 23 in the direction represented by arrows 31 and magnetizes section 24 in the direction represented by arrows 32. The flux produced by current $i$ in section 23 is in the same direction as that produced by the component $F_x$ of the externally applied field. In section 24, the flux existing due to the field associated with the electrical current is in the reverse direction with respect to that due to the externally applied field. The flux induced in sections 23 and 24 by the current $i$ forms closed loops within the core material, and there is thus no significant external flux resulting from this current.

It is apparent that for a condition in which the core is magnetically unsaturated, as current $i$ is increased, the flux produced in section 23 due to current $i$ will be equal in intensity but oppositely directed to that produced due to the current in section 24. Therefore, there will be no change in the amount of external flux during the period in which the core is unsaturated. However, due to the fact that the flux resulting from component $F_x$ aids the magnetizing field of current $i$ in section 23, as current $i$ increases in intensity, section 23 will achieve saturation before section 24 reaches saturation. During the interval in which section 23 is saturated and section 24 is approaching saturation, the external flux is reduced, and it reaches zero when section 24 becomes saturated. The external flux remains zero during the interval in which both sections of the core are saturated and remains so until the excitation current decreases in intensity to the point at which section 24 is at the threshhold of leaving saturation. During the interval of decreasing current intensity when section 24 is unsaturated and section 23 is saturated, the external flux builds up until section 23 becomes unsaturated, at which time the external flux remains constant. During the reverse cycle of current, the same form of pulsation of the external flux occurs.

The operation can be better understood by referring to Fig. 3. In Fig. 3, the sinusoidal-shaped line 32 represents the variation in the magnitude and direction of the excitation field $H_a \cos \alpha$ that exists at the magnetic material of section 23. Line 33a represents the variation in the external flux leaving one end and entering the other end of core 22. During interval A, in which $H_a \cos \alpha$ is increasing in magnitude, both sections of the core are unsaturated. During interval B, section 23 is saturated and section 24 is approaching saturation, and the external flux intensity decreases and becomes zero at the end of this interval, at which time section 24 becomes saturated. The external flux remains zero during intreval C, in which sections 23 and 24 are saturated. During interval D, when section 24 is unsaturated and section 23 is still saturated, the external flux increases and reaches its maximum intensity at the end of the interval, when section 23 is at the threshhold of leaving saturation. Interval E represents the period during which both sections of the core are unsaturated and the external flux remains constant at its maximum intensity. Intervals F, G, and H are similar, respectively, to intervals B, C, and D except that during the negative phase of the alternating field cycle, section 24 enters saturation before and leaves saturation after section 23.

By surrounding the core with a pickup coil, such as coil 19 in Fig. 1, the flux pulsations can be detected by means of the voltages generated across the windings of the coil. The wave form of the voltages generated across the windings of the pickup coil will have approximately the shape shown by line 33b of Fig. 3, which line may be obtained by differentiating the flux pattern illustrated by line 33a.

The voltage induced in the pickup coil will be comprised mainly of even-order harmonics of the excitation frequency and will be of a magnitude which is proportional to the externally-applied field $F_x$, where $F_x$ is a weak field, such as that of the earth. Some odd-order harmonics will exist in small quantity due to mechanical imperfections, stresses in the magnetic material of the core and other causes. However, the odd-order harmonics will be of such a low level that they can be eliminated by filters far simpler than those required for those prior-art magnetometers in which the fundamental frequency is not cancelled out during the periods of the excitation cycle in which the core is unsaturated. The absence of fundamental frequency voltages (or their existence at low level) in the pickup coil is due also in part to the fact that the direction of the excitation field is such that it makes no direct coupling with the pickup coil.

A neutralization winding may also be employed in the embodiment of Fig. 2. This winding may comprise a wire 6 which threads both core sections in the same direction. A direct current $i$ in the wire will have an annular field $H_d$, which will induce fluxes indicated by arrows 7 and 9 in core sections 23 and 24 so as to neutralize the flux produced by the static field $F_x$.

While the core 22 in Fig. 2 has been shown with the ends of sections 23 and 24 connected together, satisfactory operation may be obtained with the adjacent ends spaced to form magnetic gaps, in which case the manufacturing problem is simplified. However, if the ends are joined, as shown, the magnetic flux produced in core 22 by the alternating excitation field is presented with an endless magnetic path, and the material of the core exhibits its maximum permeability to the excitation field; hence the core is readily saturated by the magnetic field associated with a current of low intensity.

In the case of a rod of magnetic material magnetized by the magnetic field associated with a current flowing in a solenoid surrounding it, magnetic poles develop at the ends of the bar and exert demagnetizing forces which impede the magnetization of the bar. Since no poles are generated by the excitation field in the core of Fig. 2, no such demagnetizing forces are presented to the excitation field. However, the applied static field will encounter demagnetizing forces because of the fact that such a field develops magnetic poles at the ends of the core. In the case of a round, straight bar being magnetized by a static field, the magnitude of the demagnetizing forces will decrease as the length-to-diameter ratio of the bar is increased. In order to obtain a favorable length-to-diameter ratio, the outside diameters of sections 23 and 24 are preferably made as small as is practical.

If it is desired to improve the length-to-diameter ratio at the expense of requiring a higher excitation current but to retain the elimination of the excitation frequency from the pickup coil, a magnetic core of the type illustrated in Fig. 4 may be employed. In this figure a magnetic core 33 is illustrated as comprising a section 34 having a right-hand helix, a straight section 35, and section 36 having a left-hand helix. Wire 37 serves as the carrier for the excitation current and wire 38 serves as the carrier for the direct current used for neutralizing the effect of the static field applied to the core. In the form shown, wire 37 threads core sections 34 and 36 in the same direction, while wire 38 threads the sections in opposite directions.

Component $F_x$ acting parallel with centerline 39 of core 33 will induce an external flux represented by lines 40. The excitation current $i$, when flowing in the direction represented by arrows 41, results in the production of external flux lines represented by lines 42 and 43. When current $i$ is zero, only the external flux represented by lines 40 is present. When the core is completely saturated by the field associated with current $i$, only the flux represented by lines 42 and 43 exists. Below the saturation level and for the direction of the current illustrated in Fig. 4, the externally applied field aids the saturation of section 34 and opposes that of section 36. Therefore, section 34 will go into saturation before section 36 thereby producing external flux pulses similar in character to those described for the operation of core 22 illustrated in Fig. 2. These flux pulsations can be detected by means of a pickup coil surrounding core 33 as set forth previously.

A preferred physical form of the invention is illustrated in Fig. 5. In this figure core sections 23 and 24 are supported by tubes 44 and 45, which may comprise a highly refractory material, such as aluminum oxide, suitable for supporting the core when the latter is annealed at high temperatures to achieve the most desirable magnetic properties. The extremities of tubes 44 and 45 may be supported by means of discs 46 and 47 which have close-fitting holes through which the ends of the tubes extend. Discs 46 and 47 closely fit the bore of a spool 48 which supports the windings 20 of a pickup coil. Tubular flanges 49 and 50 are preferably held against the ends of spool 48 by means of screws 51. These flanges bear against the discs to hold the core at the center portion of the bore of the spool. Discs 52 and 53, which are made of electrical insulating material, may also be held on the spool by means of screws 51.

Terminals 54, 55, 56, 57, 58 and 59 secured to discs 52 and 53 provide means for making electrical connections from inside the bore of the spool to the exterior. The excitation winding 61 may be comprised of insulated copper wire which makes numerous loops through the bores of tubes 44 and 45. The ends of the excitation winding are separately soldered to terminals 54 and 55. While the excitation windings illustrated previously are single wires or loops, multiple loops are preferred in the actual construction to achieve impedances which can be easily matched to other circuit components.

One end of a neutralization winding 62 is soldered to terminal 56, from which it continues through the bore of tube 44, then back through an insulated tube 63, followed by a passage through the bore of tube 45, and back through insulated tube 63. This path is repeated so as to provide an equal number of electrical conducting paths through tubes 44 and 45. The remaining end of winding 62 is soldered to terminal 59. A similar circuit is provided for neutralization winding 64 except that the passage external to tubes 44 and 45 is made through insulated tube 65.

A magnetic shield surrounding the core and coil unit of Fig. 5 has been indicated by the phantom lines s. Such a shield may be employed when it is desired to utilize the apparatus to measure a direct current, for example, in order to eliminate the effect of external fields.

Fig. 6 illustrates the application of the principles of the invention to a circuit for measuring variations in the earth's magnetic field. The magnetic field sensing element 66, illustrated in Fig. 5 is generally represented in Fig. 6 by the diagrammatically indicated circuit parts shown within the dashed line. Since no electrical connections are made to the magnetic core, for the sake of simplicity the magnetic core is not illustrated within the confines of the dashed line, but it is understood to be present in the actual apparatus.

An excitation current of some frequency $p$ is generated by oscillator 67. The output current of the oscillator is passed through a simple filter 68 which impedes the flow of any current other than of $p$ frequency which may have been generated by the oscillator. The output current of filter 68 is fed through excitation winding 61. The detector circuit including pickup coil 20 is tuned by means of capacitor 69 to have a resonant frequency of $2p$ cycles per second. The output signal from pickup coil 20 is passed through filter 70 which prevents the transmission of any signal voltages of frequency $p$. The purified $2p$-frequency signal from filter 70 is amplified by amplifier 71, and the amplified $2p$-frequency signal is fed to phase detector and rectifier 72.

A portion of the $p$-frequency output of filter 68 is fed to a frequency doubler circuit 73 where a $2p$ frequency signal is generated and its phase adjusted. The $2p$-frequency output signal of frequency doubler circuit 73 is connected to the phase detector and rectifier 72, where this signal is employed as a reference in determining the phase of the signal output of amplifier 71. The output signal of amplifier 71 will lead or lag the signal from the frequency doubler by a phase angle of 90 degrees depending upon the direction (right to left or left to right) of the earth's field magnetizing the core of field-sensing element 66.

The phase detector is conventional and regulates the polarity of the direct current output of its associated rectifier. The output of the rectifier is passed through neutralization winding 62 to oppose a part of the effect of the earth's magnetic field in magnetizing the core. A recording milliameter 74 is included in this neutralization circuit to measure the magnitude of the fed-back D.C. current. The recording milliameter is calibrated to indicate the amount of current in terms of the amount of the earth's field neutralized in the core plus the amount of unneutralized field required to maintain the feedback current.

In most cases the magnitude of the variations of the earth's field that are to be measured is very small, representing such a minute fraction of the total magnitude of the earth's field that the variations cannot be observed by means of a single neutralization circuit. A second neutralization circuit may be employed with which by far the greatest portion of the earth's field effect is neutralized. The electrical direct current $dc_2$ employed in the second neutralization circuit is obtained from battery 75, the output terminals of which are connected to the input of a variable resistance box 76. The output of resistance box 76 is connected across the terminals of neutralization winding 64. The resistance box 76 is used to adjust the amount of direct current passed through winding 64 and is calibrated in terms of the amount of field effect neutralized by current $dc_2$. Thus, by means of the values indicated by resistance box 76 and milliameter 74 the magnitude of the earth's field action along the axis of sensitivity of inductor 66 can be determined.

The magnetometer units of the invention may be employed in groups. For example, three orthogonally arranged units may be utilized to measure the corresponding coordinates of the earth's field. The invention may be employed to measure fields other than the earth's field and indeed may be employed for measuring other types of phenomena. If the field from a direct current is coupled to the core, as by passing the current along a wire threaded through the core, the magnitude of the current may be measured by virtue of the proportionality of the current magnitude and the associated magnetic field. Moreover, the core embodiments of the invention may be employed for other purposes well known to those skilled in the art. For example, if an alternating current of the same frequency as the excitation current is passed through winding 6, a signal of excitation frequency and proportional in magnitude to the current in winding 6 will appear across the pickup coil.

Because of power losses arising due to eddy currents, the diameter of the wire from which the cores are made should be small. A wire diameter of .005 inch has been found to be satisfactory for excitation frequencies up to 5000 cycles per second. Greatly increased efficiency can be obtained by employing wide, flat strips having thicknesses of the order of .001 inch which are wound so as to have small spaces separating adjacent turns.

The cores illustrated in the drawings and described above comprise single coil helical windings. Multiple coil windings, in which two or more wires are wound to form a helical section, can be used in order to obtain a greater amount of metal acted upon by the excitation field, without reducing the helix angle.

The description of the invention above has been centered around a permeable magnetic wire that has been wound in a helical manner. Similar results are obtainable by constructing a magnetic core which has interconnected annular and straight portions, such that the earth's field, for example, is effective on the straight portions and the excitation field effective on the annular portions. Straight sections paralleling the axis of the core can be added so as to alter the length-to-diameter ratio of the core in such cases where lower demagnetizing forces presented to the externally applied field are desirable.

While preferred embodiments of the invention have been shown and described, it will be apparent to those skilled in the art that many variations can be made without departing from the principles of the invention. The embodiments shown and described are therefore to be considered as exemplary rather than restrictive, and any modifications which fall within the range of equivalency of the appended claims are intended to be included within the scope thereof.

What I claim is:

1. In a device of the type described, a permeable magnetic core comprising a pair of elongated coils arranged side-by-side and coupled magnetically at their adjacent ends, first means for magnetizing both said coils along their length in the same direction, and second means for magnetizing said coils along their length periodically and in opposite directions.

2. In the device of claim 1, the last-mentioned means comprising a wire threaded through said coils.

3. In a device of the type described, an elongated coil of permeable wire, first means producing an annular field and coupled to said coil for magnetizing said coil along its length and for periodically driving said core into saturation, and second means producing a field along the axis of said coil and coupled to said coil for magnetizing said coil along its length.

4. In the device of claim 1, the last-mentioned means comprising a source of alternating current of sufficient magnitude to drive said core into saturation on each half-cycle, pickup means responsive to variations in the flux through said core, and detector means connected to said pickup means and responsive to an even-order harmonic of said alternating current.

5. In the device of claim 4, neutralization means coupled to said detector means and said core for magnetizing said core in opposition to the magnetization produced by said first means, and indicating means responsive to said neutralization means.

6. In a device of the type described, a magnetic core comprising a pair of axially successive elongated permeable coils coupled magnetically at their adjacent ends, means for magnetizing said coils in the same direction along their length, and means for magnetizing said coils cyclically along their length in opposite directions and for driving them into saturation.

7. In the device of claim 3, neutralization means isolated from the aforesaid means mechanically and electrically for magnetizing said coil in opposition to one of said means.

8. In the device of claim 3, said first means comprising means for driving said coil into saturation alternately in opposite directions along its length.

9. In a device of the type described, a permeable magnetic core comprising a pair of elongated coils arranged side-by-side and coupled magnetically at their adjacent ends, first means for magnetizing both of said coils periodically along their length in the same direction and second means for magnetizing said coils along their lengths periodically and in opposite directions.

10. In a device of the type described, a permeable magnetic core comprising a pair of elongated coils arranged side-by-side and coupled magnetically at their adjacent ends, first means for magnetizing both said coils along their length in the same direction, and second means for magnetizing said coils along their length and in opposite directions.

11. A device of the type described comprising a magnetic core having a pair of helical coils of permeable material arranged with their axes side-by-side and being magnetically coupled at their ends, means including an electrical conductor coupled to said coils for magnetizing said coils in opposite directions and for periodically driving the same into saturation, and means responsive to the flux around said core.

12. A magnetic field measuring device comprising a magnetic core having a pair of helical coils of permeable material, said coils having a common axis, and means including an electrical conductor arranged along the common axis for magnetizing said coils in opposite directions and for periodically driving the same into saturation, and a pick-up coil having a portion thereof linking one of said helical coils and a portion linking the other of said helical coils, whereby, in the absence of an outside field, the voltage generated in the pick-up coil by the flux generated in one helical coil is substantially cancelled by the flux generated in the other helical coil.

13. The device of claim 12, wherein said coils are, respectively, right-hand and left-hand helices.

References Cited in the file of this patent

UNITED STATES PATENTS

| | | |
|---|---|---|
| 1,735,092 | Roller | Nov. 12, 1929 |
| 2,410,039 | Beach | Oct. 29, 1946 |
| 2,543,843 | Frosch | Mar. 6, 1951 |
| 2,727,206 | Ryerson | Dec. 13, 1955 |

FOREIGN PATENTS

| | | |
|---|---|---|
| 592,241 | Great Britain | Sept. 11, 1947 |